United States Patent Office 3,159,443
Patented Dec. 1, 1964

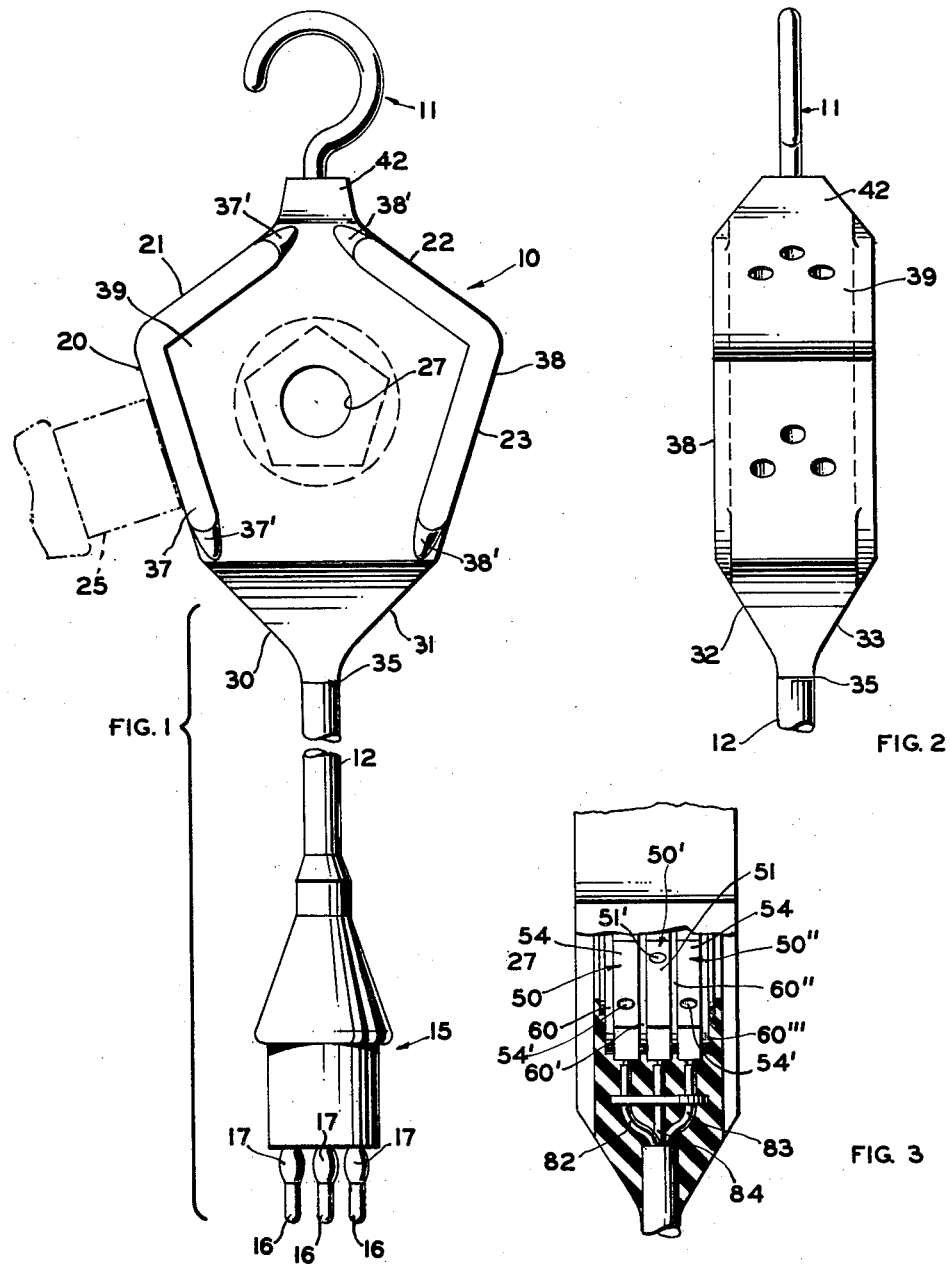

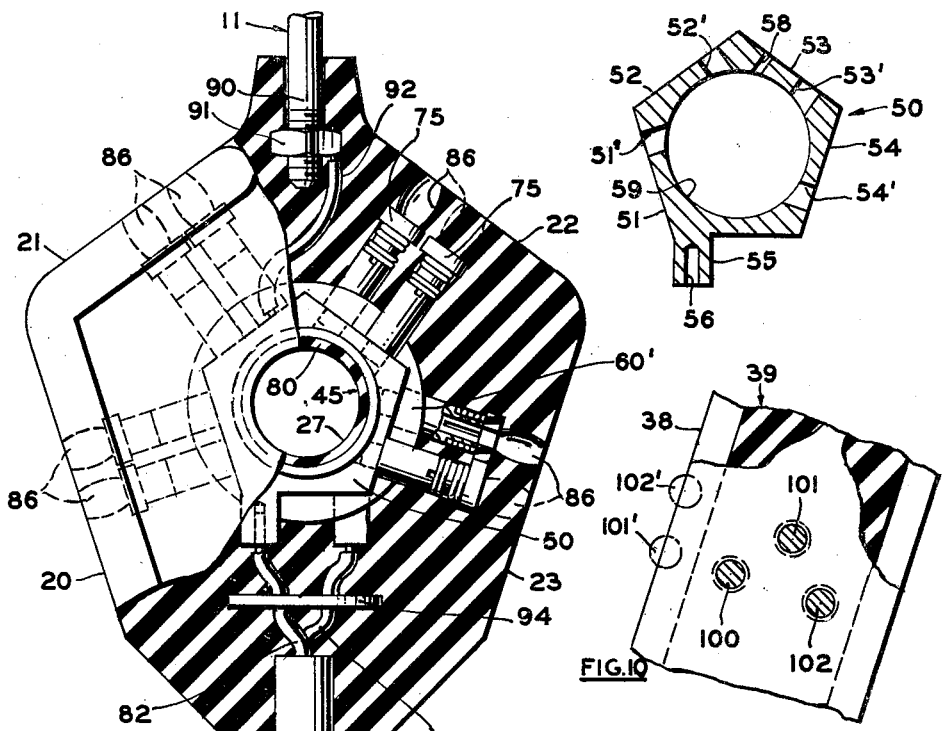
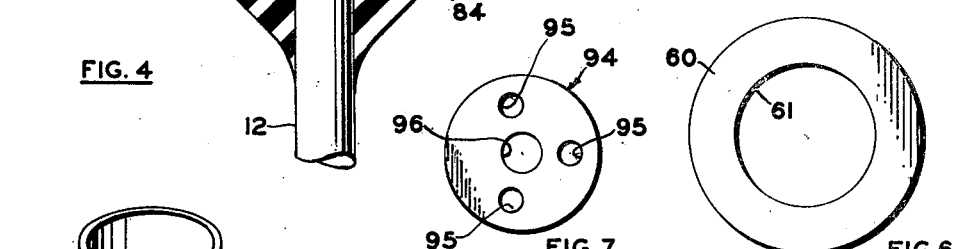
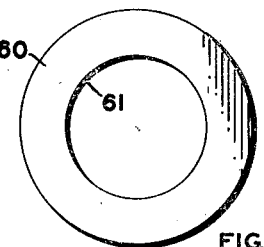
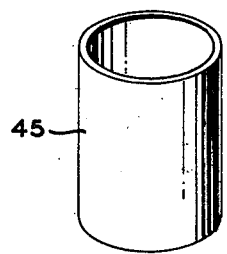
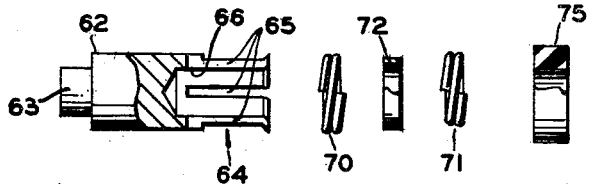

3,159,443
ELECTRICAL DISTRIBUTION DEVICE
Oliver M. Hart, West Cornwall, Conn.
Filed July 19, 1961, Ser. No. 125,139
12 Claims. (Cl. 339—14)

The present invention relates to a new and novel electrical distribution device, and more particularly to an electrical distribution device which is especially adapted for use in a portable power distribution system. The electrical distribution device of the present invention is of the type which is adapted to provide at a single central location a plurality of electrical outlet means to which a number of different connectors can be electrically connected. This type of device is especially useful in power distribution systems as employed at the sites of heavy construction such as in shipbuilding and the like wherein it is desired to employ portable tools and accessories at different locations and it is essential to move these tools and accessories as well as the associated cords and cables from place to place.

In such heavy-duty construction applications, the cable associated with the electrical distribution device of the present invention usually lies along the ground and is dragged along the ground in being moved from one place to another. Accordingly, the electrical distribution devices employed must be of very rugged and durable construction such that they can withstand the heavy abuse which is normally encountered in this type of application. It will, of course, be understood that the electrical distribution device of the present invention can be utilized in any application wherein it is desired to provide a plurality of electrical outlet means at a single central location and wherein it is necessary to move the device from time to time.

The electrical distribution device of the present invention comprises an integral molded unit which is adapted to be connected with suitable plug connectors or the like so as to provide a waterproof and electrically insulated joint with such connectors which may be attached to cables or cords which are in turn connected with portable tools and various other accessories. It is, of course, important to provide not only a good electrical connection, but one which is electrically insulated so as to prevent hazardous electrical shocks to personnel handling the equipment. The provision of a plurality of outlets which are disposed at a single central location and which can be moved easily from place to place, of course, increases the versatility of the portable power distribution system by permitting the system to be rapidly set up and dismantled at different locations.

When in use, a plurality of plug connectors may be simultaneously plugged into the device of the present invention, and accordingly, the various outlet means of the invention device are suitably angularly spaced from one another such that the entire plug connector can be easily manually grasped without interference with adjacent plug connectors thereby facilitating plugging and unplugging of the connectors with respect to the electrical distribution device.

As mentioned previously, it is a common practice to drag the cable and the associated fitting along the ground in moving the apparatus from place to place. The device includes a main body which is fixed to a current-supplying cable, and the body can be dragged along the ground simply by pulling on the attached cable. The body of the present invention device is accordingly particularly constructed in accordance with this contemplated use.

The electrical contact members are all embedded within the body means such that the contacts are completely protected, and there are no exposed portions which could be easily broken or damaged. The body of the device is formed of a suitable material such that it can readily absorb shock and is sufficiently rigid and durable to withstand blows or impacts which may occur thereto during use.

The body means is additionally provided with a novel outer configuration so as to facilitate its movement from place to place. The outer surface of the body is tapered from an intermediate portion thereof inwardly to the junction of the associated cable such that when the body is dragged along a supporting surface, the tapered configuration thereof will tend to cam the body away from any external objects which it may engage thereby preventing the body from catching or snagging on such objects. In addition, the body is provided with raised runner-like portions along the opposite edges thereof, these portions facilitating sliding of the body means along a supporting surface. The runner-like portions as well as the tapered configuration of the body serves to minimize abrasion which may occur to the body while dragging it over a supporting surface. The aforementioned raised portions also serve an additional function in preventing a plug connector from being plugged into the outlet means of the device in any but the proper manner.

A plurality of bus-bars are embedded in the body and are electrically connected to the wires of the current-conducting cable. These bus-bars are of a generally annular configuration and each of the bus-bars has a plurality of contact members extending outwardly therefrom at spaced angular positions thereon. The bus-bars are of identical configuration thereby providing economy of manufacture, and at least one of the bus-bars is disposed in a reverse position relative to the other bus-bars to provide the desired staggered relationship of the contact members as will hereinafter appear.

The generally annular configuration of the bus-bars themselves is advantageous as compared to a bus-bar in the form of an elongated rod for example, since any break which may occur at an intermediate portion of the bus-bar will not interrupt current to any of the contact members. Accordingly, even if a break should occur at some intermediate portion of the bus-bars, the contact members thereof will each still be provided with current through the bus-bar. In addition, by providing this closed loop form of bus-bar, the heat is more effectively conducted away from the point of connection to one of the cable wires.

A plurality of insulators of identical configuration are also provided, these insulators being disposed intermediate adjacent pairs of bus-bar members to effectively electrically insulate the bus-bar members from one another. The insulators also are of identical configuration to provide economy of manufacture.

The bus-bar members and insulators are initially held in position while the body is molded therearound by mounting the bus-bar members and insulators on a central support member. The completed body includes a central opening which extends through the central support member which is generally cylindrical in configuration, this central opening serving to facilitate handling and hanging up of the device, and in addition, serving as a means for providing an internal surface for cooling the bus-bar members.

A support hook is provided, the shank of the hook being embedded within the body and further being electrically connected with the bus-bar member which is electrically connected to the ground wire of the cable. The support hook member is formed of metallic material which is electrically conductive whereby the hook member not only serves as a means for hanging up the device, but also serves as a ground when connected to a suitable electrically conductive member thereby providing an added safety feature for the device.

An object of the present invention is to provide a new and novel electrical distribution device comprising an integral unit which provides a plurality of electrical outlet means at a single location and which further provides a water-proof and electrically insulated joint with an associated connector.

Another object of the invention is the provision of an electrical distribution device wherein the bus-bar members are so constructed as to effectively conduct heat away from the point of electrical connection to a conductor and further which will continue to conduct current to the various contact members associated therewith even if an intermediate portion of the bus-bar member should be broken.

A further object of the invention is to provide an electrical distribution device wherein the various outlet means are so angularly spaced with respect to one another that plug connectors associated therewith can be completely manually grasped to facilitate plugging and unplugging thereof.

A still further object of the invention is the provision of electrical distribution device wherein the configuration of the body thereof permits ready sliding movement over a supporting surface without snagging or catching on external objects and further which prevents an associated plug connector from being connected into the device in an improper manner.

Yet another object of the invention is to provide an electrical distribution device incorporating a support hook means which is so connected with the bus-bar means as to provide an additional ground to thereby serve as a safety feature.

A still further object of the invention is to provide an electrical distribution device which is quite simple and inexpensive in construction and which is sturdy and reliable in use.

Other objects and many attendant advantages of the invention will become more apparent when considered in connection with the specification and accompanying drawings, wherein:

FIG. 1 is an elevation of an electrical distribution device according to the present invention;

FIG. 2 is a side view of the upper portion of the device shown in FIG. 1;

FIG. 3 is a view of the lower portion of the body broken away to illustrate the internal details of construction;

FIG. 4 is an enlarged view of the body of the distribution device with a portion of the electrical insulating material of the body cut away along a plane passing medially through the body;

FIG. 5 is a longitudinal sectional view of a bus-bar member incorporated in the present invention;

FIG. 6 is an elevation of an insulator incorporated in the device;

FIG. 7 is an elevation of a spacer member embedded within the body of the device;

FIG. 8 is a perspective view of the central support member of the device;

FIG. 9 is an exploded view illustrating the contact member assembly of the invention; and FIG. 10 is a view illustrating the manner in which the raised portions on the edge of the body means prevent an associated plug connector from being plugged into the device in an improper manner.

Referring now to the drawings wherein like reference characters designate corresponding parts throughout the several views, there is shown in FIG. 1 an electrical distribution device according to the present invention including a body indicated generally by reference numeral 10 having a hook-like member 11 connected to one end portion thereof, and an elongated current-carrying cable 12 connected to the opposite end thereof. The terminal end of cable 12 is provided with a more or less conventional plug connector indicated generally by reference numeral 15 having three longitudinally extending prongs or conductors 16 at the outer end thereof, the inner portions of these prongs being surrounded by bulbous portions 17 of electrical insulating material which cooperate with suitable recesses provided in an associated member to provide a fluid-tight joint therebetween.

It will be noted that the body 10 as seen in FIG. 1 is provided with four substantially planar side surfaces 20, 21, 22 and 23 which are angularly related to one another, and an electrical outlet means is provided in each of these faces such that a conventional plug connector indicated by reference numeral 25 and shown in phantom lines may be plugged into the outlet means formed in each of these side surfaces. It will of course be understood that the number of side surfaces and associated outlet means may be varied as desired, and that the four outlet type body shown is merely for the purpose of illustration.

The body is formed of a molded electrical insulating material such as neoprene or the like, and as seen in FIG. 1, a centrally disposed opening 27 is provided through the body, this opening facilitating handling of the body since a rope or chain may be passed therethrough, and if desired, the body can be suspended by such a rope or chain which is passed through opening 27. This opening additionally serves to provide an internal surface adjacent to the bus-bar members to facilitate the conduction of heat away from the bus-bar members thereby serving a cooling function.

It will be noted from an inspection of FIGS. 1 and 2 that the side surfaces 30 and 31 as well as the front and rear surfaces 32 and 33 of the lower portion of the body means as seen in these figures tapers inwardly toward the junction 35 of the body and the cable 12. These inwardly tapering surfaces 30–33 serve to prevent the body from catching or snagging on external objects when the body is dragged across a supporting surface. It is apparent that when these surfaces 30–33 engage any type of external object, the slope thereof will tend to cam the body away from such an object to obtain the desired results.

As seen in FIG. 1, a pair of raised portions 37 and 38 extend above the front surface 39 of the body, these portions 37 and 38 serving as runners when the body is dragged across a supporting surface. It will be noted that the opposite end portions 37' of portion 37 as well as the opposite end portions 38' of portion 38 slope downwardly to the surface 39 thereby ensuring that these runner portions will also be cammed upwardly over any protruding objects which it may strike as it is dragged across a surface. A similar pair of raised portions are provided along the side edges of the body at the opposite side thereof as seen in FIG. 1, and one of these portions 39 is visible in FIG. 2.

It will also be noted that the upper portion 42 of the body tapers toward the upper end thereof to ensure that the body will also not snag or catch on external objects should it be dragged along by the hook-like member 11.

Referring to FIG. 8, a central support member 45 is provided, this support member being of cylindrical configuration, and as seen in FIG. 4, central support member 45 is embedded in the central portion of the body. Fitted about the central support member are a plurality of bus-bar members and insulators as presently described.

Referring now to FIG. 5, a bus-bar member indicated generally by reference numeral 50 is shown in cross-section and it will be seen that member 50 is provided with four angularly related surfaces 51, 52, 53, and 54, these flat planar surfaces having openings 51', 52', 53', 54' formed therethrough respectively.

The bus-bar members also each include an attaching portion 55 having a hollow bore 56 therein for receiving one wire of the current-conducting cable secured to the body. The wire may either be crimped in place inside bore 56 or soldered therein or any other means of electrically connecting the wire to the bus-bar may be employed. The bus-bar itself is preferably formed of extruded copper or other material of good electrical conductivity characteristics.

It will be noted that face 53 of bus-bar 50 is also provided with an additional opening 58 formed therethrough, and the purpose of this opening will hereinafter appear. A circular opening 59 is provided through the central portion of the bus-bar member, and opening 59 is of such dimension as to fit snugly about support member 45 such that the bus-bar members can be assembled on a support member and held in proper position while the body is molded therearound.

Referring to FIG. 6, an electrical insulator 60 is illustrated, this member being formed of a suitable electrical insulating material such as a laminated phenolic, insulator 60 being of flat annular configuration. It is important to note that the outer dimension of insulator 60 is greater than the outer dimension of the five-sided bus-bar 50, and the purpose of this relationship will be presently described. A central opening 61 is provided through the insulator, the diameter of opening 61 being substantially the same as that of the outer surface of support member 45 whereby the insulator may be snugly received on the central support member.

Referring now to FIG. 9 the contact means of the present invention is illustrated and includes a main contact member 62 having a reduced end portion 63 which is received within one of the openings 51', 52', 53', 54' of the bus-bar member 50. Contact member 62 is operatively connected to the bus-bar by brazing or other suitable means.

The end portion 64 of main contact member 62 is provided with four equidistant spaced slots 65, and it will be noted that the outer dimension of portion 64 is less than that of the adjacent portion of the main contact member. Portion 64 defines a hollow cavity 66 which is adapted to receive one of the prong conductor elements of a plug connector and the like.

A pair of coiled spring members 70 and 71 are provided, and a retaining ring 72 is also provided, these three elements being disposed around end portion 64 of the main contact member with the retaining ring sandwiched between the two spring members, this assembly being shown more clearly in FIG. 4. The spring members and retaining ring are provided for obtaining a resilient outer end portion of the contact means and for limiting outer movement of the resilient end portion thereof.

A washer 75 of suitable electrical insulating material such as a plastic is also provided, this washer in the assembled device serving primarily to guide the contact prong members of a connector plug into place within the hollow resilient end portions of the main contact members 62.

Referring now to FIGS. 3 and 4 of the drawings, it will be seen that a layer 80 of the material of the body is disposed inside central support member 45, layer 80 defining the central opening 27 through the body.

Three spaced bus-bar members 50, 50' and 50" are fitted on central support member 45 and spaced slightly from one another. Four insulators 60, 60', 60" and 60''' are also fitted about central support member 45, it being noted that insulator 60' is sandwiched between bus-bar members 50 and 50' while insulator 60" is sandwiched between bus-bar members 50' and 50". Insulator 60 is disposed outwardly of bus-bar member 50 while insulator 60''' is disposed outwardly of bus-bar member 50". As mentioned previously, the outer dimensions of the insulators are greater than the outer dimensions of the bus-bar members, and accordingly, the bus-bar members are effectively insulated from one another.

The intermediate bus-bar member 50' is in the reverse position from bus-bar members 50 and 50" such that as seen mostly clearly in FIG. 3, the surface 51 of bus-bar members 50 and 50".

With this arrangement, it will be seen that the opening 51' of bus-bar member 50' is staggered with respect to the openings 54' of the bus-bar members 50 and 50".

A contact assembly as seen in FIG. 9 is associated with each of the openings provided in the faces of the bus-bar members and it will be apparent that the contact members are disposed in a staggered relationship in accordance with the above description. This staggered relationship is similar to the conventional three-pronged plugs as employed in the art wherein the two prongs which define the base of a triangle are the hot leads while the other prong which forms the apex of a triangle comprises the ground lead. Accordingly, the bus-bar members 50 and 50" as seen in FIG. 3 are connected to the hot wires of the cable while the intermediate bus-bar member 50' is connected to the ground wire of the cable. As seen in FIG. 3, the hot wires are indicated by reference numerals 82 and 83 while the ground wire is indicated by reference numeral 84.

As seen in FIG. 4, the washers 75 adjacent the outer resilient ends of each of the contact members are embedded within the material of the body, and formed within the body adjacent each of washers 75 is a hollow chamber 86 having the same general configuration as the bulbous portions formed on a cooperating plug connector. These chambers and the bulbous projections cooperate to form a fluid-tight seal in a well-known manner while the metallic prongs of the connector are guided into place by washers 75. As seen in FIG. 4, the lower shank portion 90 of the hook-like member 11 extends within the upper end portion of the body and a nut 91 is threaded onto the lower threaded end of the shank.

An electrical lead 92 has one end thereof operatively connected to nut 91 while the opposite end thereof is connected within the opening 58 formed in the central bus-bar member 50'.

Hook-like member 11 is formed of a suitable conductor such as iron or the like and provides an additional ground for the device since the hook-like member is electrically connected to the center bus-bar member which is in turn connected with the ground wire of the cable 12.

Referring now to FIG. 7 a spacer member 94 is illustrated, this spacer member having a plurality of openings 95 formed therethrough and a central opening 96 formed therethrough. Spacer member 94 is also formed of a suitable electrical insulating material such as laminated phenolic, and each of thhe wires 82, 83, and 84 passes through one of the openings 95 in the spacer member 94. When the body is molded about the spacer member, an integral portion of the body will, of course, extend through central opening 96 to thereby assist in locking the spacer member in operative position.

This spacer member not only serves to hold the wires of the cable in proper position while molding the body, but assists in preventing the cable from pulling out of the body when dragging the body around by pulling on the cable.

It is evident that the contact members may be disposed in any relationship to one another and staggered in any manner as desired so as to accommodate different type plug connectors.

The insulators between adjacent bus-bar members, of course, provide a longer electrical path between the bus-bar members, and the outer dimension of the insulators may be increased to lengthen this path if such is considered desirable.

It will be noted that the central support member 45 as well as spacer member 94 serve to maintain the various components in the proper relationship to one another while the body is being molded therearound thereby providing an effective means for manufacturing the device in a most simple and economical manner.

It is evident that a plurality of outlet means are provided in a single integral molded unit and that a waterproof and electrically insulated joint is provided between the device of the present invention and a conventional plug connector and the like.

The generally annular construction of the bus-bar members forms a closed loop such that heat will be effectively conducted away from the point of connection between the bus-bar members and the cable wires. In addition, it is apparent that the bus-bar members will continue to conduct current to the various contact members associated therewith even when there is a break in an intermediate portion of any bus-bar member. It will be noted that the outlet means defined at each of the external side faces of the body are angularly related to one another in such a manner that plug connectors associated with the device may be completely grasped in the hand to permit ready plugging and unplugging thereof.

The raised runner portions as described previously permit ready sliding movement of the body over a supporting surface, and in addition these raised portions provide an additional safety feature as described hereinafter.

Referring to FIG. 10, an enlarged view of a portion of one of the side surfaces of the body is shown, and reference numerals 100, 101 and 102 designate plug connector prongs as seen in cross-section as the prongs would be inserted within the contact members of the body. It will be noted that the prongs are in proper operative position, prongs 100 and 102 being the hot leads while prong 101 is the ground lead.

If the runner portions 38 and 39 as seen in this figure were not present, it will be seen that the connector could be positioned such that prong 101 would be located as indicated by reference numeral 101' while prong 102 would be located as illustrated by reference numeral 102' while prong 100 would remain in its same relationship to the body. If raised portion 38 were not present, it would be possible to plug prong member 100 in while prong member 102' would not be plugged in. This, of course, would be very undesirable since one of the hot leads would be plugged in while the other hot lead is exposed thereby creating a hazardous condition. It will be seen that with the raised portions 38 and 39 present, it is impossible to plug in a plug connector in any but the proper manner thereby providing an important safety feature. The tapered configuration of the body serves to prevent its becoming caught or snagged on external objects when dragged across a supporting surface as described previously and the hook-like member 11 serves the dual function of providing a means for hanging up the device and as an added electrical ground for the device.

Economy of manufacture is obtained in the present invention by utilizing a plurality of identical members and in particular the bus-bar members which are of identical configuration can be reversed to provide the desired staggered relationship of the contact members as described above.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An electrical distribution device comprising a body of electrical insulating material, a current-carrying cable fixed to a portion of said body, said body having embedded and permanently molded therein a plurality of outlet means angularly spaced from one another, said cable including a plurality of wires, said wires being electrically connected to said outlet means, and the outer surface of said body tapering inwardly from an intermediate portion of the body to the junction of said body and said cable such that the body can be dragged along a supporting surface by pulling on the cable and said tapered configuration of the body prevents the body from snagging or catching on objects, said body including a centrally disposed opening formed completely therethrough for facilitating handling or hanging up of the body, said body also having affixed therto a hook-like member for hanging up the body, the hook-like member being metallic and being electrically connected to at least one of said outlet means.

2. An electrical distribution device comprising a body of electrical insulating material, a current-carrying cable having an end portion thereof embedded and molded within said body such that the cable is permanently fixed to said body and has a plurality of wires embedded therewithin, a plurality of bus-bar members embedded within the material of said body and spaced from one another, said bus-bar members being generally annular in configuration, a plurality of insulators formed of electrical insulating material embedded within the material of said body, said insulators being of generally annular configuration, there being an insulator disposed between each pair of adjacent bus-bar members for electrically insulating the bus-bar members from one another, each of said bus-bar members being electrically connected to one of the wires of said cable, and a plurality of contact members connected to each of said bus-bar members, the contact members connected with each bus-bar member being angularly spaced with respect to one another.

3. A device as defined in claim 2, wherein each of the bus-bar members is of identical construction, at least one of said bus-bars being disposed in reverse position relative to the other bus-bars, and the contact members of the bus-bars being in staggered relationship to one another so as to receive a plug having contact members of similarly staggered relationship.

4. An electrical distribution device comprising a body of molded electrical insulating material, a current-carrying cable having an end portion thereof embedded and molded within said body such that the cable is permanently fixed to said body and has a plurality of wires embedded therewithin, a plurality of generally annular bus-bar members embedded within the material of said body, each of said bus-bar members being electrically connected with one of the wires of said cable, said bus-bar members being of identical construction and each having a plurality of annularly spaced contact members extending outwardly therefrom and also embedded within said body, the contact members of adjacent bus-bar members being staggered with respect to one another to define a plurality of angularly spaced outlet means, the contact members having hollow resilient outer end portions for receiving a cooperating contact of a plug, a plurality of generally annular insulators formed of electrical insulating material, there being an insulator disposed between each pair of adjacent bus-bar members, the insulators having a greater outer dimension than the adjacent bus-bar members so as to effectively electrically insulate the bus-bar members from one another.

5. An electrical distribution device comprising a body of molded electric insulating material, a current-carrying cable having an end portion thereof embedded and permanently molded within a portion of said body, said cable including a plurality of wires therewithin and extending within said body, a central support member disposed within said body, said support member being formed of electrical insulating material and being generally cylindrical in configuration, a plurality of bus-bar members of generally annular configuration fitted on said central support member, each of said bus-bar members being connected to one of the wires of said cable, each of said bus-bar members having a plurality of annularly spaced contact members connected thereto and extending outwardly therefrom, the contact members of adjacent bus-bar members being staggered with respect to one another so as to define a plurality of angularly spaced outlet means for receiving a plurality of plug connectors, a plurality of generally annular spacer rings fitted on said central support member and being formed of electrical insulating material, said insulator members being disposed between adjacent pairs of bus-bar members, said insulators having a greater outer dimension than the bus-bar members for effectively electrically insulating the bus-bar members from one another.

6. Apparatus as defined in claim 5, including a hook-like member of metallic construction embedded within a portion of said body, said hook-like member being electrically connected to one of said bus-bar members, said one bus-bar member being connected to the ground wire of the cable whereby the hook-like member serves the dual function of providing a means for hanging up the body and further provides an extra ground for the device as an added safety feature.

7. Apparatus as defined in claim 5, wherein each of said contact members includes a hollow resilient outer end portion for receiving a cooperating contact member, and said body has formed therein adjacent the outer end portion of each of said contact members a hollow chamber which opens through the outer surface of the body.

8. A device as defined in claim 5, including a spacer member embedded within said body means adjacent the end of said cable, said spacer member having a plurality of openings formed therethrough, each of the wires of said cable extending through one of said openings, and said spacer member including a centrally disposed opening through which extends an integral portion of the body for additionally locking the spacer member in position.

9. An electrical distribution device comprising a body of molded electrical insulating material, a current-carrying cable having the terminal end thereof embedded and permanently molded within and fixed to a portion of said body, the outer surface of said body being tapered from an intermediate portion thereof inwardly to the junction of said body and cable so that the body can be dragged along a supporting surface and the tapered configuration will prevent snagging or catching of the body on objects, a central support means within said body of generally cylindrical configuration, said body having an opening formed through the central portion of said support means for facilitating handling and hanging up of the body, a plurality of generally annular bus-bar members fitted on said support member, each of said bus-bar members being electrically connected to one of the wires of said cable, each of said bus-bar members being connected with a plurality of annularly spaced contact members extending outwardly therefrom, said contact members being embedded within said body and having hollow resilient outer end porions for receiving cooperating contact members of a plug connector or the like, the contact members of adjacent bus-bar members being staggered with respect to one another to thereby define a plurality of angularly spaced outlet means, a plurality of generally annular insulators formed of electrical insulating material and having an outer dimension greater than said bus-bar members, said insulators being fitted on said support members, an insulator member being disposed between each pair of adjacent bus-bar members for electrically insulating the bus-bar members from one another, an insulator being disposed outwardly of each of the outermost bus-bar members.

10. Apparatus as defined in claim 9, including a hook-like member of metallic material having a portion thereof embedded within said body, said portion of the hook-like member being electrically connected with one of said bus-bar members, said one bus-bar member being electrically connected to the ground wire of said cable.

11. Apparatus as defined in claim 9, including a spacer member embedded within said body, said spacer member having a plurality of openings formed therethrough, each of the wires of said cable extending through one of said openings such that the spacer member maintains the wires in spaced relationship to one another, said spacer member having a central opening through which an integral portion of the body extends for additionally locking the spacer member in operative position.

12. A device as defined in claim 9, wherein the outer ends of each of said contact members have longitudinally extending slots formed therein, said outer ends of each of the contact members having spring means disposed therearound and engaging the outer surface thereof thereby providing resiliency for the outer ends of each of the contact members, and washer members being embedded within said body adjacent the outer ends of each of the contact members for guiding cooperating contact members into operative position.

References Cited in the file of this patent

UNITED STATES PATENTS

| 654,138 | Dennett | July 24, 1900 |
| 1,675,763 | McCarthy | July 3, 1928 |
| 1,848,759 | Wiegand | Mar. 8, 1932 |
| 2,047,045 | Veenboer | July 7, 1936 |
| 2,087,384 | Lee | July 20, 1937 |
| 2,089,856 | Reynolds | Aug. 10, 1937 |
| 2,268,090 | Windsor | Dec. 30, 1941 |
| 2,677,115 | Stevens | Apr. 27, 1954 |
| 2,788,502 | Schelke et al. | Apr. 9, 1957 |
| 2,831,914 | Jacobs | Apr. 22, 1958 |

FOREIGN PATENTS

| 1,040,364 | France | May 20, 1953 |
| 829,324 | Germany | Jan. 24, 1952 |
| 483,579 | Great Britain | Apr. 21, 1938 |